March 13, 1945. E. R. IRSTAD 2,371,330
TRANSMISSION DEVICE FOR MACHINE TOOLS
Filed Nov. 28, 1942 2 Sheets-Sheet 1
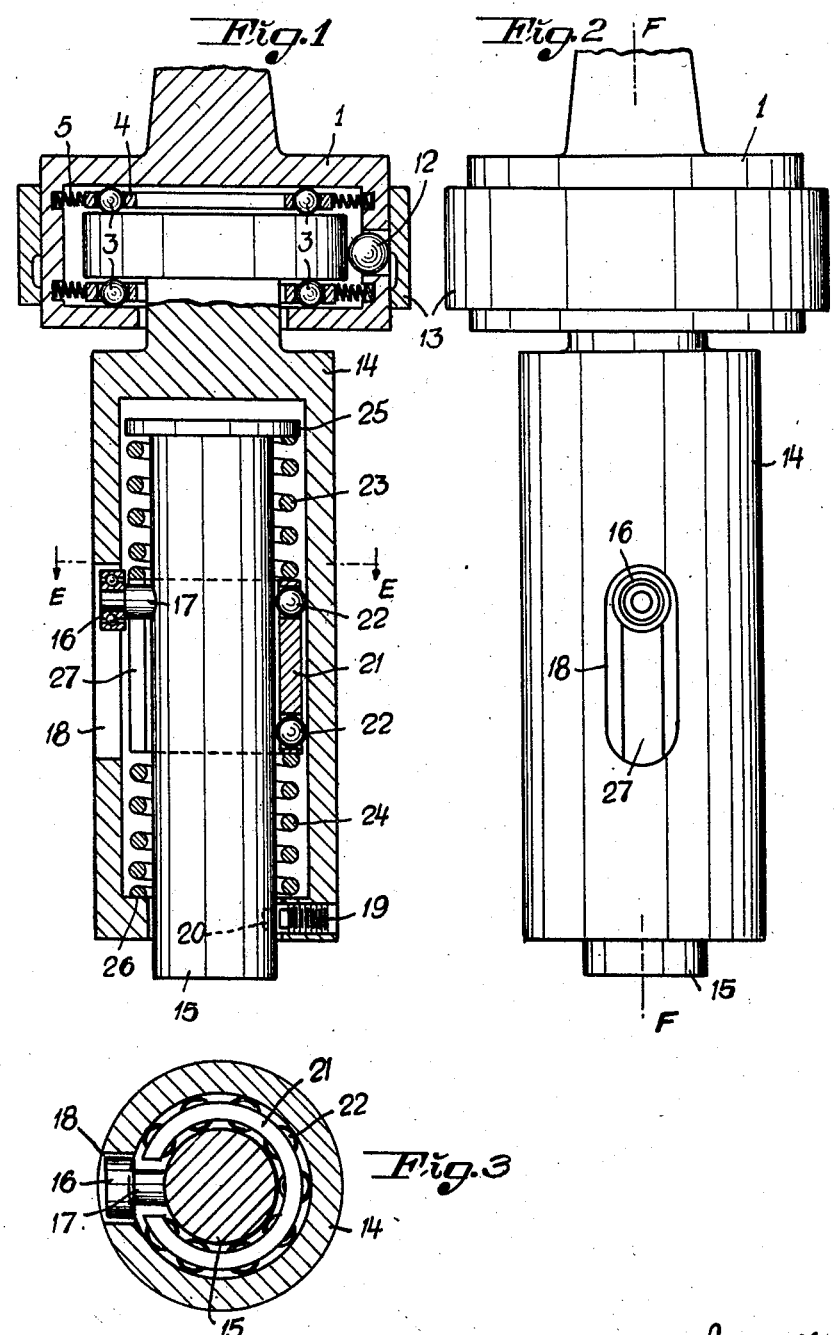

March 13, 1945.  E. R. IRSTAD  2,371,330
TRANSMISSION DEVICE FOR MACHINE TOOLS
Filed Nov. 28, 1942  2 Sheets-Sheet 2
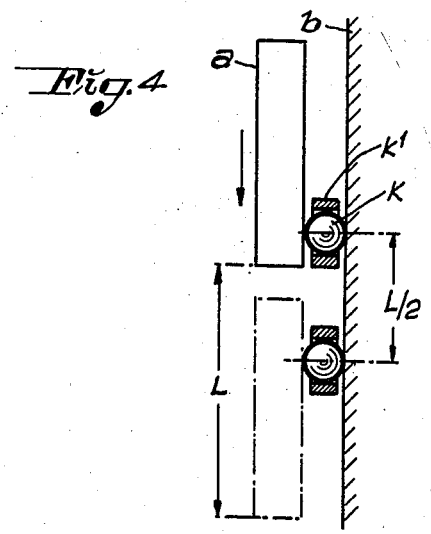
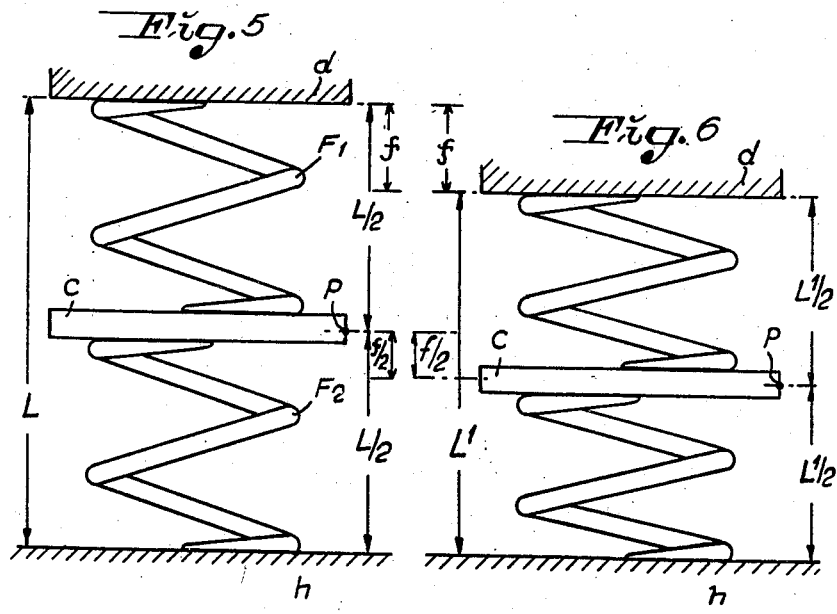
Inventor:
Eric Richard Irstad,
by Pierce + Scheffler,
Attorneys.

Patented Mar. 13, 1945

2,371,330

UNITED STATES PATENT OFFICE 2,371,330

TRANSMISSION DEVICE FOR MACHINE TOOLS

Eric Richard Irstad, Stockholm, Sweden

Application November 28, 1942, Serial No. 467,256
In Sweden November 28, 1941

6 Claims. (Cl. 279—16)

If holes are to be drilled, for instance, by means of twist drills and drilling bushes, it is desirable that the axis of the drill should coincide with the axis of the drilling bush, in order to prevent angular displacement of the drill and to reduce to a minimum the friction between the drill and the bush.

In screw cutting or reaming operations, it is absolutely necessary that the tap, broach or other tool be fully concentric with the drilled hole, as otherwise the tool would be subject to bending forces and stresses, with the result that the tool would be subject to extreme wear and the final hole would be conical and uneven.

If holes are to be drilled and provided with threads, for instance in a drilling machine, one may proceed in a manner such that after the hole has been drilled the drilling tool is exchanged for the screw cutting tool and the threads are cut without lateral displacement of the drilling spindle and work piece relative to each other, whereby concentricity between the screw cutting tool and the drilled hole can be practically warranted. A corresponding method of procedure may be used in reaming or similar operations.

For technical and economical reasons, the preferred method of procedure is to drill as many holes as possible in one operation and thereafter to finish the holes or to provide the same with threads in a subsequent operation. Experience has shown that, in this case, it is practically impossible by eye to place the tap or other tool, exactly in the center of the hole, resulting in a hole or thread of poor quality and great wear of the tool. These inconveniences make themselves noticeable especially in the working of light metals. Since threads are one of the most frequently used machine elements in the mechanical industries, it is highly important that their mode of manufacture be carried out in an economic manner and so as to obtain at the same time a high quality of the work.

To this end, devices have been constructed which are intended to reduce or eliminate the influence of eccentricity between the hole and the tool by allowing the latter to be displaced parallel to itself and to adjust itself concentrically with respect to the hole or bush.

Good results with an apparatus of the kind indicated are obtainable only if the friction within the apparatus is reduced to a minimum. It is well known that mounting by means of balls may give excellent results in this respect.

Devices are also known in which balls are used in order to obtain the above named advantages. However, the fact has been overlooked that, if balls are to work as antifriction members, they must have a possibility freely to roll. If the balls are retained in a certain position and consequently, are prevented from rolling freely, they have lost their property as antifriction elements and merely cause superfluous complication of the apparatus. It has also been overlooked that a ball cannot roll about more than one axis at a time.

The present invention relates to apparatuses for drilling, screw cutting, broaching, reaming and the like operations, including a driving member and a driven member movable relative to the driving member within certain limits. The principal object of the invention is to provide an apparatus of the kind indicated by which highest quality of the work can be obtained due to the fact that the tools during the rotation of the apparatus may be displaced without giving rise to bending forces due to friction within the apparatus.

This and other objects I attain by mechanisms shown by way of example in the accompanying drawings, in which—

Fig. 1 is a sectional view of an embodiment of the invention, the section being taken on the line F—F, Fig. 2; Fig. 2 illustrates the apparatus as viewed from the left of Fig. 1; Fig. 3 is a section on the line E—E, Fig. 1; and Figs. 4 to 6 are diagrammatic illustrations for the explanation of the mode of operation of the apparatus shown in Figs. 1 to 3.

The apparatus according to the invention can be used either in connection with a stationary tool and a rotating work, such as for drilling and screw cutting on the lathe, or in connection with a rotating tool and a stationary work, such as in a drilling machine. In the latter case, in constructions hitherto carried out, it occurs that the balls or ball cages, for instance as a result of the rotation of the tool, are forced by the centrifugal forces into such a position, that upon movement in a certain direction of the members mounted on the balls, no rolling will take place, but the rolling will be replaced by sliding.

Figs. 1 to 3 show an apparatus in which a ball cage is positively actuated in a manner such that the balls are prevented from being displaced into positions in which they may perform a sliding movement rather than a mere rolling movement. This is substantially attained by the ball cage being arranged in such a manner that upon relative displacement, by a certain distance, of the driving and the driven member said ball cage will be displaced half of said distance. The ball cage is advantageously disposed between springs which are resilient in the direction of said relative movement, one of said springs abutting against the driving member and another one against the driven member.

The apparatus illustrated in Figs. 1 to 3 comprises an external member 1 connected with a driving motor (not shown), and a member 14 mounted in the member 1, which member 14 in turn cylindrically surrounds a driven member 15, such as a holder for a screw cutting tool. The member 14 may, in this instance, conveniently be termed the driving member. The driven member 15 is provided with a torque transmitting member consisting of a ball bearing 16 which by means of a pin 17 is connected with the member 15. The driving member 14 is provided with an axial slot 18 through which the torque is transmitted from the driving member 14 to the driven member 15. Member 15 is permitted to perform axial movements relative to member 14, said movement being limited by the length of the slot 18. If desired, said members may be locked to each other by means of a screw 19 adapted to cooperate with a recess 20.

In the space between the members 14 and 15, there is arranged an axially displaceable annular ball cage 21 which carries two rows of balls 22. The ball cage 21 is disposed between two springs 23 and 24 of equal lengths and equal characteristics. The upper spring 23 abuts against a flange or shoulder 25 on the driven member 15, whereas the lower spring 24 abuts against a flange or shoulder 26 on the driving member 14. The ball cage 21 is provided with an axial slot 27 in which the pin 17 can move upon axial movement of the member 15 relative to the member 14 and the ball cage 21.

In the following description referring to Figs. 4 to 6, it shall be proved that the balls 22 upon relative axial displacement between the members 14 and 15 will be positively actuated to perform mere rolling movements or, in other words, that the ball cage and the balls will be displaced at equal velocities.

If, according to Fig. 4, a ball $k$ disposed in a ball cage $k'$ is arranged between two parallel planes $a$ and $b$ and if the plane $a$ is displaced in the direction of the arrow and the ball $k$ is permitted to roll without sliding between the two planes, any point on the plane $a$ will be displaced relative to the plane $b$ twice as long a distance as will the ball $k$ and the ball cage $k'$ be displaced relative to the plane $b$. Mere rolling movement can occur only if neither the ball nor the ball cage are locked, but are movable both relative to plane $a$ and plane $b$.

Two helical springs are assumed to be constructed and arranged so as to fulfill the following condition:

According to Fig. 5, the springs $F_1$ and $F_2$ have equal lengths and characteristics and are inserted between a plate $c$ and two parallel planes $d$ and $h$, the distance between said planes being L. A point P on the plate $c$ is located at equal distances L/2 from both planes.

If the springs $F_1$ and $F_2$ are compressed by a distance $f$ (Fig. 6), the distance between the planes $d$ and $h$ will become $L_1 = L - f$. Point P is then still located at equal distances $L_1$ from the planes $d$ and $h$ and has thus been displaced the distance $f/2$;

$$\left(\frac{L}{2} - \frac{L^1}{2} = \frac{L}{2} - \frac{L-f}{2} = \frac{f}{2}\right)$$

Referring now to Fig. 1, if member 15 is axially displaced relative to member 14, the lengths of the springs 23 and 24 will be altered to equal extents. Consequently, in accordance with the explanation given with reference to Figs. 4 to 6, the ball cage 21 and the balls 22 will be displaced synchronously, with the result that the balls will always have the possibility freely to roll in axial direction within the limits determined by the possibility of relative movement of the members 14 and 15, which members consequently can be displaced relative to each other with the least possible resistance due to friction.

When threads are to be cut in a machine by means of taps, it is absolutely necessary not only to place the tap concentrically with the drilled hole, but also to feed the tap during the rotation with such a velocity that the tap during one revolution is axially moved a distance equal to the pitch of the thread. Otherwise, that is, if the feed velocity were greater or less than the velocity corresponding to the thread pitch, the thread would be successively "eaten up" and become too weak and, besides, the tap would be subject to axial forces which cause excessive wear. If the material worked has great strength, the axial stresses may obtain such great values that the tap will break.

When threads are to be cut in materials with small strength it often occurs that the tap at too high or too low feeding velocities deforms the hole without forming threads. This has been observed particularly in cutting operations in light metals.

When threads are cut in drilling machines and the tap is fed by hand, it is practically impossible to accommodate the axial movement of the tap to the movement of the machine spindle. This inconvenience can obviously be avoided by making the tap or the tap holder axially displaceable relative to the machine spindle.

Screw cutting apparatuses have been constructed in which the tap is axially movable and guided in a keyway provided in a holder. Exhaustive investigation have proved, however, that in the apparatus named such great braking resistance due to friction will arise in axial direction during the transmission of the torque required for the cutting operation that a perfect thread having complete thread profiles cannot be obtained.

Said inconveniences may be reduced to some degree by means of special screw cutting machines provided with a guide screw or other means for obtaining a feeding velocity which corresponds to the tap pitch. However, in these machines, wearing occurring sooner or later will, even if comparatively small, become noticeable and cause deformation of the thread profile.

In order to reduce the risk of rejecting expensive work pieces of light metal, for instance in the air craft industry, as a result of the above named difficulties, the threads are at present cut manually.

The ideal thread would be obtained by means of a weightless tap, which, irrespective of the position of the apparatus, can find its way merely under the influence of the torque.

By suitable dimensioning the springs 23 and 24, the weight of member 15 and of the tap and tap holder can be compensated, whereby the tap will be practically weightless so that the thread will not be subject to substantial axial forces.

The invention is obviously not limited to the embodiments shown and described by way of example only.

What I claim is:

1. A transmission device for machine tools, comprising a driving member, a driven member movable relative to said driving member within predetermined limits, a number of balls for mounting said driven member, resilient means for maintaining said balls in positions such as always to have the possibility of rolling freely within limits defined by the possibility of relative movement of said members, and means for centering said driven member relative to said driving member, said centering means comprising balls disposed between said members, and a movable centering member for displacing said last named balls into centering position.

2. A transmission device for machine tools, comprising a driving member, a driven member movable relative to said driving member within predetermined limits, a number of balls for mounting said driven member, a ball cage for guiding said balls, and springs resilient in the direction of said relative movement, one of said springs being inserted between said ball cage and said driving member, and the other one of said springs being inserted between said ball cage and said driven member.

3. A transmission device for machine tools, comprising a driving member, a driven member movable relative to said driving member within predetermined limits, a number of balls for mounting said driven member, a ball cage for guiding said balls, and springs resilient in the direction of said relative movement, one of said springs being inserted between said ball cage and said driving member, and the other one of said springs being inserted between said ball cage and said driven member, said springs having equal lengths and characteristics.

4. A transmission device for machine tools, comprising a hollow cylindrical member, a tool holder axially displaceable within said cylindrical member, a number of balls between said member and said tool holder, an annular ball cage for guiding said balls, two helical springs of equal lengths and characteristics, one of said springs being inserted between said ball cage and said cylindrical member, the other one of said springs being inserted between said ball cage and said tool holder, and means for transmitting rotational movements from said cylindrical member to said tool holder.

5. A transmission device for machine tools, comprising a hollow cylindrical member, a tool holder axially displaceable within said cylindrical member, a number of balls between said member and said tool holder, an annular ball cage for guiding said balls, said ball cage having an axial slot, two helical springs of equal lengths and characteristics, one of said springs abutting against said ball cage and said cylindrical member, the other one of said springs abutting against said ball cage and said tool holder, and means for transmitting rotational movements from said cylindrical member to said tool holder, said means including a carrier secured to said tool holder and radially extending through said slot, and a ball bearing mounted on said carrier and engaging said cylindrical member.

6. A transmission device for machine tools, comprising a driving member, a driven member vertically movable relative to said driving member within predetermined limits, a number of balls for guiding said members relative to each other, a ball cage for said balls, two springs resilient in vertical direction, one of said springs being inserted between said ball cage and said driving member, the other one of said springs being inserted between said ball cage and said driven member, said springs being dimensioned substantially such as to compensate the weight of said driven member, and means for transmitting rotational movements from said driving member to said driven member.

ERIC RICHARD IRSTAD.